Nov. 27, 1951  A. RAPPL  2,576,809
WINDSHIELD CLEANER
Filed June 24, 1946
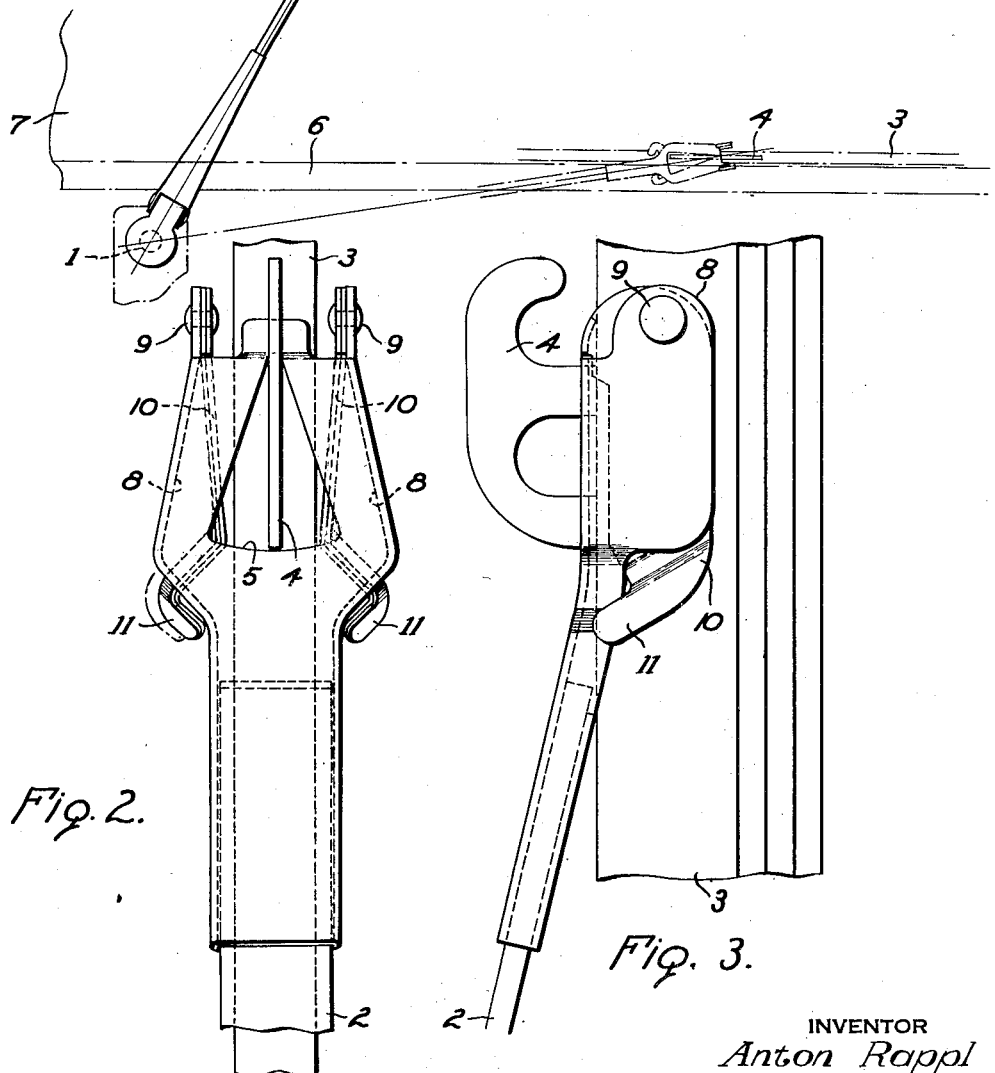
INVENTOR
Anton Rappl
BY
Beau, Brooks, Buckley & Beau.
ATTORNEYS Patented Nov. 27, 1951

2,576,809

UNITED STATES PATENT OFFICE 2,576,809

WINDSHIELD CLEANER

Anton Rappl, Eggertsville, N. Y., assignor to Trico Products Corporation, Buffalo, N. Y.

Application June 24, 1946, Serial No. 678,937

7 Claims. (Cl. 15—250)

This invention relates to a windshield cleaner, and primarily to the wiper carrying arm thereof. It has heretofore been proposed to attach the wiping blade to its arm in a manner to enable the blade being parked squarely against the molding of the windshield. In the Oishei Patent 2,286,004 there is shown such a construction. According to the disclosure of such patent there is provided a pair of spring leaves carried by one element and straddling a part of the attached companion element for yieldably holding the blade directly beneath the arm during normal operation while being adapted to yield to enable angular displacement of the blade for lying fully against the windshield frame molding when the arm is moved to its parked position. In such prior construction it is possible for one or both of the spring leaves to become displaced, or one spring leaf may press more firmly than the other spring leaf, with the result that the blade is not yieldably supported in its normal position and consequently the windshield cleaner will not function throughout to its most efficient capacity.

The primary object of the present invention is to provide an improved arm of this type in which the correct position of the wiper blade with respect to its carrying arm will be insured under normal conditions of operation.

More particularly the invention has for its object to provide a construction of the foregoing nature in which the normalizing or centering spring leaves are constructed and arranged in a manner to avoid the blade being urged beyond the center line of the carrying arm by either one of the leaves.

The invention resides in a construction providing for a greater efficiency in windshield cleaning, as will become more apparent in the following description, reference being made to the accompanying drawing, wherein:

Fig. 1 is a fragmentary front elevation of a windshield showing a cleaner embodying the present invention applied thereto;

Fig. 2 is an enlarged plan view of the outer end of the wiper carrying arm; and

Fig. 3 is a fragmentary view of the outer end of the arm in side elevation.

Referring more particularly to the drawing, the numeral 1 designates the actuating shaft of a windshield cleaner to which the arm 2 is fixed for being oscillated thereby. The numeral 3 designates the windshield blade having a mounting or attaching fin 4 in the shape of a hook-like member designed to be hooked into the opening 5 in the outer end of the arm. While any suitable mounting of the blade on the arm may be provided which will permit angular displacement of the blade from beneath the arm for parking against the windshield molding or frame 6 of the windshield 7, the simple form of mounting herein disclosed has been found practical in use. For this purpose the opening 5 is of substantially triangular shape so as to enable the blade swinging laterally from beneath the arm so as to rest squarely against the molding. This provides a head on the free end of the arm which in plan view is substantially triangular in shape, and depending from the two outwardly converging edges of the triangular head is a pair of limit stop flanges 8 which determine the maximum extent of angular displacement of the blade from beneath the arm. Fixed to the inner face of each flange, as by the rivet 9, is a flat spring or leaf 10, the two spring leaves extending normally in substantial parallelism and inwardly toward the axis of oscillation of the arm 2. These spring leaves are designed normally to bear against or lie adjacent the opposite sides of the blade so as to yieldably support the latter in a true radial plane in which the blade lies immediately beneath the adjacent portion of the arm 2 when the latter is extended in such radial plane. When the windshield cleaner is moved to its parked position, as shown by the broken line position in Fig. 1, the corresponding one of the spring leaves will yield so as to enable the wiper moving into full facial contact with the molding 6. Consequently the wiper blade will be parked neatly against the windshield frame in an inconspicuous position.

In order to insure the normal functioning of these springs in an efficient manner, the free end portions of the leaves are suitably interlocked with the arm so as to prevent one leaf having predominance over the companion leaf. To this end the rear or free end portion of each spring is provided with an upstanding and offset ear 11 which overlies the outer side face of the arm so as to serve as a means for determining the normal position of the spring and also constitute a stop to limit the inward flexure of the leaf beyond such normal position. By this arrangement each centralizing spring 10 is interlocked between the adjacent flange 8 and such side portion of the arm engaged by its ear 11 to define the extent of spring distortion. Each spring 10 may be formed of a single leaf or, as illustrated, it may be composed of plural leaves.

By this arrangement the centralizing springs 10 will always be insured a proper position for the normal operation of the wiper, but will nevertheless be free to yield in permitting the blade to assume a parked position broadside against the windshield molding. Furthermore, the springs will be supported against becoming bent or deformed, or should one spring be heavier than the other it will be restrained against moving the blade out of proper position. Thus an efficient wiping action is insured.

The foregoing description has been given in detail for clarity, but without thought of limitation since the inventive principles involved are capable of assuming other physical embodiments without departing from the spirit of the invention and the scope of the appended claims.

What is claimed is:

1. A windshield cleaner having a wiping blade, an actuating arm therefor operable to move the blade back and forth on a windshield surface, means connecting the blade to the arm and enabling angular displacement of the blade laterally of the arm to bring the blade broadside against the windshield frame, opposed resilient means carried by the arm at opposite sides of the blade and acting substantially to centralize the blade with respect to the arm while yielding to enable such angular displacement for parking the blade against the windshield frame, and means serving to limit the movement of one yielding means toward the companion yielding means to insure the blade centralization.

2. A windshield cleaner having a wiping blade, an actuating arm therefor operable to move the blade back and forth on a windshield surface, means connecting the blade to the arm and enabling angular displacement of the blade laterally of the arm to bring the blade broadside against the windshield frame, and opposed resilient means carried by the arm independently of each other and straddling the blade to centralize the latter with respect to the arm while yielding to enable such angular displacement for parking the blade against the windshield frame, each yielding means having a stop part engageable with a portion of the arm in individually restraining its movement toward the other yielding means beyond a predetermined position.

3. A windshield cleaner having a wiping blade, an actuating arm therefor operable to move the blade back and forth on a windshield surface, means connecting the blade to the arm and enabling angular displacement of the blade laterally of the arm to bring the blade broadside against the windshield frame for parking the same, and resilient means at opposite sides of the blade normally urging the blade toward a central position with respect to the arm for wiping, said resilient means being yieldable outwardly from a normal position to enable such an angular displacement and having position-determining parts engageable with parts of the arm to restrain inward movement beyond the normal position.

4. A windshield cleaner having a wiping blade, an actuating arm therefor operable to move the blade back and forth on a windshield surface, means connecting the blade to the arm and enabling angular displacement of the blade laterally of the arm to bring the blade broadside against the windshield frame, a pair of flat springs arranged one on each side of the blade and anchored at one end to the arm with their opposite end portions extending alongside of the blade to hold the latter substantially in a central position with respect to the arm for wiping the surface, and means on the arm cooperating with said opposite end portions to restrain the movement of the springs toward each other.

5. A windshield cleaner having a wiping blade, an actuating arm therefor operable to move the blade back and forth on a windshield surface, means connecting the blade to the arm and enabling angular displacement of the blade laterally of the arm to bring the blade broadside against the windshield frame, and a pair of flat springs arranged one on each side of the blade and anchored at one end to the arm with their opposite end portions extending alongside of the blade to hold the latter substantially in a central position with respect to the arm for wiping the surface, said opposite end portions of the springs having ears engaging the adjacent exterior sides of the arm for limiting inward flexure of the spring toward the blade.

6. A wiper arm for windshield cleaners, having a substantially triangular shaped opening in its outer end for receiving a mounting part of a wiper blade to permit angular displacement of the blade laterally of the arm, said arm having outwardly converging limit flanges at opposite sides of the opening, blade centralizing flat springs secured at the forward ends of said flanges and extending rearwardly in spaced relatoin to receive the blade therebetween, the inner end portions of the springs having parts interlocking with the arms to restrain inward movement of the springs toward each other beyond a predetermined extent.

7. A wiper arm for windshield cleaners, having an opening in its outer end for receiving a mounting part of a wiper blade to permit angular displacement of the blade laterally of the arm, said arm having outwardly converging flanges at opposite sides of the opening to limit the angular displacement, blade centralizing flat springs secured at the forward ends to the inner faces of said flanges and extending rearwardly in spaced relation to receive the blade therebetween, the inner end portions of the springs having stop ears overhanging the outer opposite sides of the arm to abut thereagainst in limiting the inward flexure of the springs toward each other.

ANTON RAPPL.

REFERENCES CITED

The following references are of record in the file of this patent:

UNITED STATES PATENTS

| Number | Name | Date |
|---|---|---|
| 1,694,245 | Baker | Dec. 4, 1928 |
| 1,695,326 | Folberth | Dec. 18, 1928 |
| 2,286,004 | O'Shei | June 9, 1942 |